UNITED STATES PATENT OFFICE.

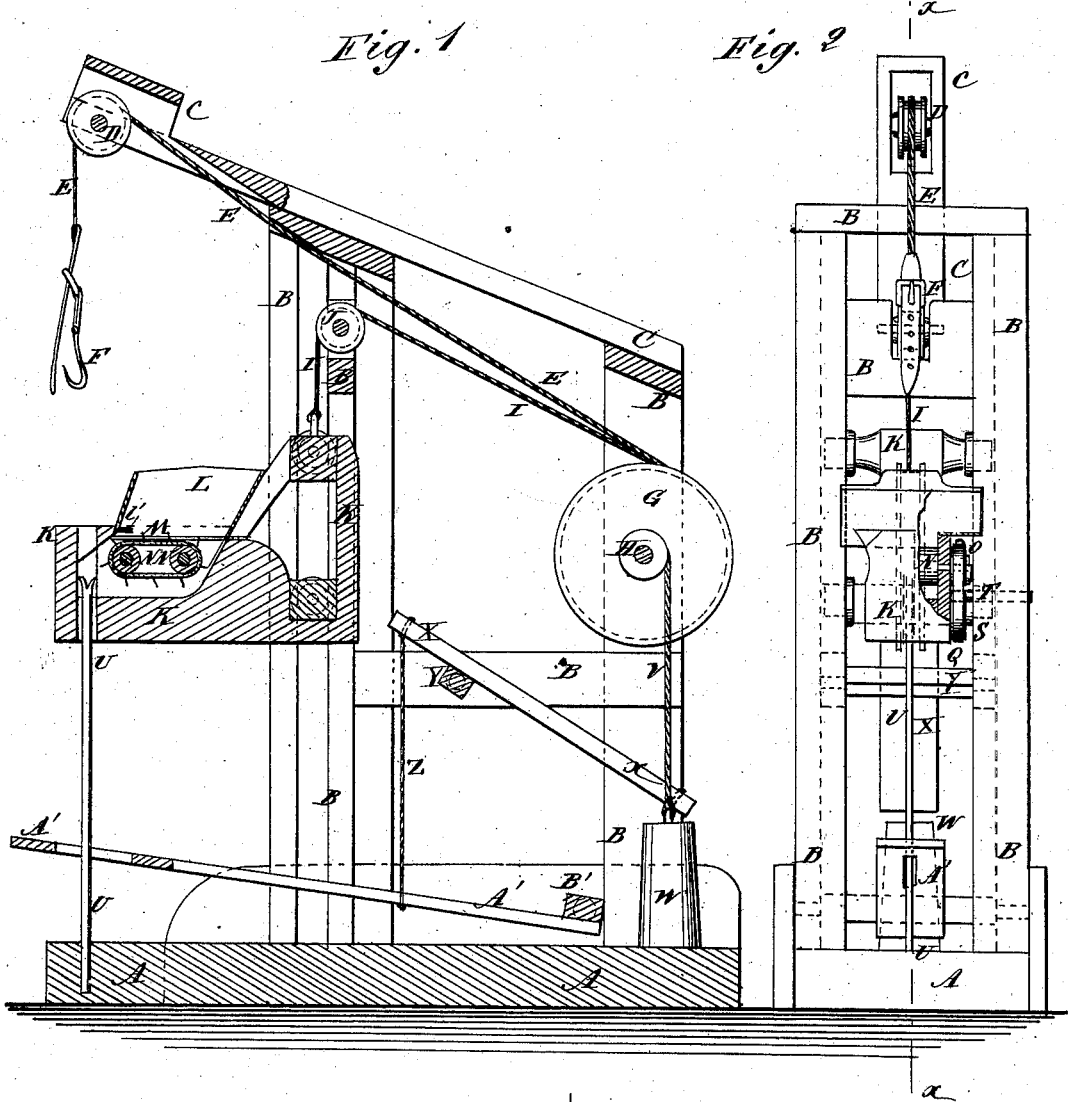

JOHN M. LICHLITER, OF LURAY, VIRGINIA, ASSIGNOR TO B. F. GRASON, JR., OF SAME PLACE.

IMPROVEMENT IN MACHINES FOR STUFFING HORSE-COLLARS.

Specification forming part of Letters Patent No. 192,174, dated June 19, 1877; application filed May 21, 1877.

*To all whom it may concern:*

Be it known that I, JOHN M. LICHLITER, of Luray, in the county of Page and State of Virginia, have invented a new and useful Improvement in Horse-Collar Stuffer, of which the following is a specification:

Figure 1 is a vertical longitudinal section of my improved machine, taken through the line *x x*, Fig. 2. Fig. 2 is a front view of the same, part being broken away to show the construction. Fig. 3 is a detail view of the feeding device.

Similar letters of reference indicate corresponding parts.

The object of this invention is to furnish an improved machine for stuffing horse-collars, which will enable the work to be done much more rapidly than when they are stuffed in the old way, and which shall be simple in construction and convenient in use.

The invention consists in the combination of the carriage, the hopper, the endless toothed belt, the rollers, and the stationary forked rod with the frame; in the combination of the pulley, the pawl-and-ratchet wheel, the strap, the spring, the armed segment, and the stop with the feed belt and rollers, the carriage, and the frame; in the combination of the rope and pulley, the pulley and shaft, and the rope and weight with the carriage and the frame; in the combination of the pulley, rope, and hook with the pulley and shaft, the rope and weight, and the frame; and in the combination of the lever, the rope, and the treadle with the weight and the frame, as hereinafter fully described.

A represents the bed-plate of the machine, to which is attached the frame B. The forward part of the frame A is the higher, and to its top is attached an inclined bar, C, to the projecting forward end of which is pivoted a pulley, D, to receive the rope E. To the forward end of the rope, or to a short strap attached to said end, is buckled or otherwise adjustably attached a hook, F, to receive the collar to be stuffed. The rope E passes back beneath the bar C, and its rear end is wound around and attached to a large pulley or drum, G, attached to the shaft H, the journals of which revolve in bearings in the rear part of the frame B. To the pulley or drum G is also attached the rear end of a rope, I, which passes over a pulley, J, pivoted to the upper forward part of the frame B. To the forward end of the rope I is attached the upper part of the rear end of the carriage K, the wheels of which move up and down in ways in the forward part of the frame B. To the forward part of the carriage K is attached the hopper L, to receive the straw or other material with which the collar is to be stuffed. The bottom of the hopper L is formed of a short endless belt, M, which is provided with teeth to take hold of the straw and carry it forward into a recess in the forward part of the carriage K. To the forward side of the hopper L, at the entrance to the recess in the forward part of the carriage K, is attached a small arm or plate, *l'*, to prevent the said recess from being clogged. The endless belt M passes around rollers N, pivoted to the carriage K, and upon one of the journals of which is placed a pulley, O. The pulley O is connected with the journal of the roller N by a pawl-and-ratchet wheel, P, so that it may carry the rollers N and belt M with it when turned forward, but may be turned back without moving the said rollers and belt. Around the pulley O passes a strap, Q, one end of which is attached to the end of a coiled or other spring R, the other end of which is attached to the carriage K. The other end of the strap Q is attached to a segmental pulley, S, which has a projecting arm, *s*, formed upon it to strike against a stop, T, attached to the frame B, every time the carriage K moves upward to operate the feed-belt M, and which is drawn back to its former position by the spring R as soon as it is released from the stop T. To the forward part of the bed-plate A is attached the lower end of a rod, U, the upper end of which is forked, and passes up through a hole in the forward end of the carriage, K, to take the straw from the carrier-belt M and force it into the collar. The rod U should be provided with a guard to prevent it from carrying out too much straw at a time. To the shaft H of the pulley or drum G is attached the end of a rope, V, which is wound around said shaft in the opposite direction from the ropes E I, and to its other end is attached a weight, W, large enough to overbalance and raise the carriage K and its attachments. To the weight W is also attached the end of a lever, X, which is attached to a rock-bar, Y, pivoted to the frame B. To the other end of the lever X is attached the end of a short rope, Z, the other end of which is attached to a foot-lever or treadle, A'. The inner end of the treadle A' is attached to a rock-bar, B', pivoted to the lower rear part of the frame B, and its forward end projects into such a position that it may be conveniently reached and operated by the operator with his foot.

In using the machine the workman hangs the collar to be stuffed by one end from the hook F, and places the straw or other material in the hopper L. He then takes the collar in his hand and holds its open lower end over the hole in the forward part of the carriage K, and presses the treadle A' down with his foot. The movement of the treadle A' raises the weight W, and allows the carriage K to descend by its own weight, the workman drawing the collar down with it. As the carriage K descends the forked rod U forces the straw into collar, which is drawn down upon it. As the workman raises his foot from the treadle A' the weight W descends and raises the carriage K, the ascent of which operates the feed-belt M and feeds more straw into the cavity of said carriage, ready to be forced into the collar as the carriage again descends. In this way a collar can be quickly, easily, and thoroughly stuffed.

Having thus described my invention, I claim as new and desire to secure by Letters Patent—

1. The combination of the carriage K, hopper L, endless toothed belt M, rollers N, and the stationary forked rod U with the frame B, substantially as herein shown and described.

2. The combination of the pulley O, the pawl-and-ratchet wheel P, the strap Q, the spring R, the armed segment S s', and the stop T with the feed belt and rollers M N, the carriage K, and the frame B, substantially as herein shown and described.

3. The combination of the rope and pulley I J, the pulley and shaft G H, and the rope and weight V W with the carriage K and the frame B, substantially as herein shown and described.

4. The combination of the pulley, rope, and hook D E F with the pulley and shaft G H, the rope and weight V W, and the frame B, substantially as herein shown and described.

5. The combination of the lever X, the rope Z, and the treadle A' with the weight W and the frame B, substantially as herein shown and described.

JOHN MARTIN LICHLITER.

Witnesses:
ALSON PIERCE,
GEO. W. RUST.